(12) United States Patent
Inouchi et al.

(10) Patent No.: US 7,663,974 B2
(45) Date of Patent: Feb. 16, 2010

(54) FISHFINDER

(75) Inventors: Mitsuhiro Inouchi, Nishinomiya (JP);
Toshiyuki Shimizu, Nishinomiya (JP);
Masahiko Mushiake, Nishinomiya (JP);
Masaki Ogata, Nishinomiya (JP);
Yoshito Okubo, Nishinomiya (JP)

(73) Assignee: Furuno Electric Company Limited, Nishinomiya-shi (JP)

( * ) Notice: Subject to any disclaimer, the term of this patent is extended or adjusted under 35 U.S.C. 154(b) by 106 days.

(21) Appl. No.: 11/542,425

(22) Filed: Oct. 2, 2006

(65) Prior Publication Data

US 2008/0080317 A1    Apr. 3, 2008

(51) Int. Cl.
*G01S 15/04*    (2006.01)
*G01S 15/96*    (2006.01)

(52) U.S. Cl. .................... 367/87; 367/93; 367/107

(58) Field of Classification Search ............... 367/87, 367/88, 93, 107–111
See application file for complete search history.

(56) References Cited

U.S. PATENT DOCUMENTS

| | | | | |
|---|---|---|---|---|
| 3,875,569 A | * | 4/1975 | Hill et al. | 342/90 |
| 4,081,783 A | * | 3/1978 | Honda | 367/101 |
| 4,597,069 A | * | 6/1986 | Milano et al. | 367/95 |
| 4,966,150 A | * | 10/1990 | Etienne et al. | 600/450 |
| 5,297,552 A | * | 3/1994 | Mignot | 600/450 |
| 6,628,569 B1 | | 9/2003 | Steiner et al. | |
| 2005/0169106 A1 | * | 8/2005 | Chen | 367/118 |
| 2006/0023570 A1 | * | 2/2006 | Betts et al. | 367/88 |

FOREIGN PATENT DOCUMENTS

| | | |
|---|---|---|
| JP | 04-016788 | 1/1992 |
| JP | 04-339288 | 11/1992 |
| JP | 05196733 A * | 8/1993 |
| JP | 2883679 | 2/1999 |
| JP | 2005-249398 | 9/2005 |

OTHER PUBLICATIONS

Kajiwara, et al., "Fish Size Estimation Using De-Convolution Method," The Institute of Electronics, Information and Communication Engineers, Jan. 1994.

* cited by examiner

*Primary Examiner*—Ian J Lobo
(74) *Attorney, Agent, or Firm*—Nutter McClennen & Fish LLP; John J. Penny, Jr.

(57) ABSTRACT

A fishfinder is provided for identifying with high precision a single fish under the ship and for measuring the length of the fish precisely. An operator of the fishfinder is assisted to grasp the depth and the length of the fish. A fishfinder transmits an ultrasound pulse having a high carrier frequency and an ultrasound pulse having a low carrier frequency by means of a pulse transmission and reception device at predetermined time intervals. A single fish echo is determined and tracked for a plurality of transmission intervals of ultrasound pulses emitted into the water. A target strength of single fish is measured based on the signal strength of a low carrier frequency echo signal from the single fish. The length of the fish is measured based on the target strength. A fish mark is displayed on the screen of an indicator, with the size of the fish mark depending on the fish length.

14 Claims, 10 Drawing Sheets

Fig.2
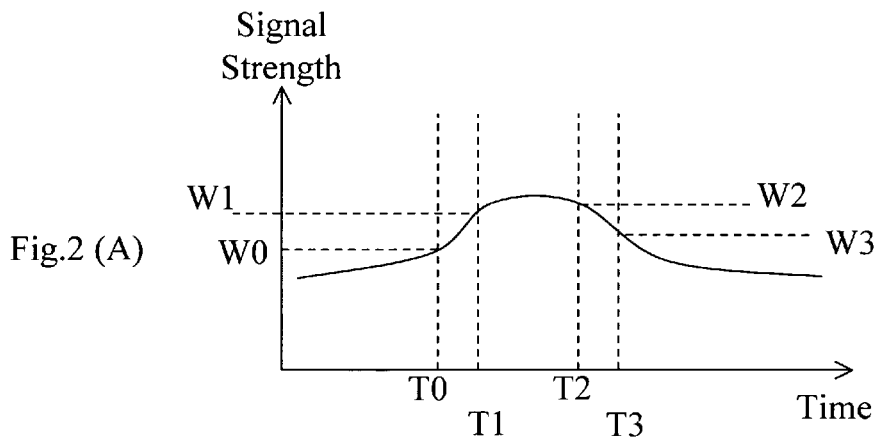
Fig.2 (A)
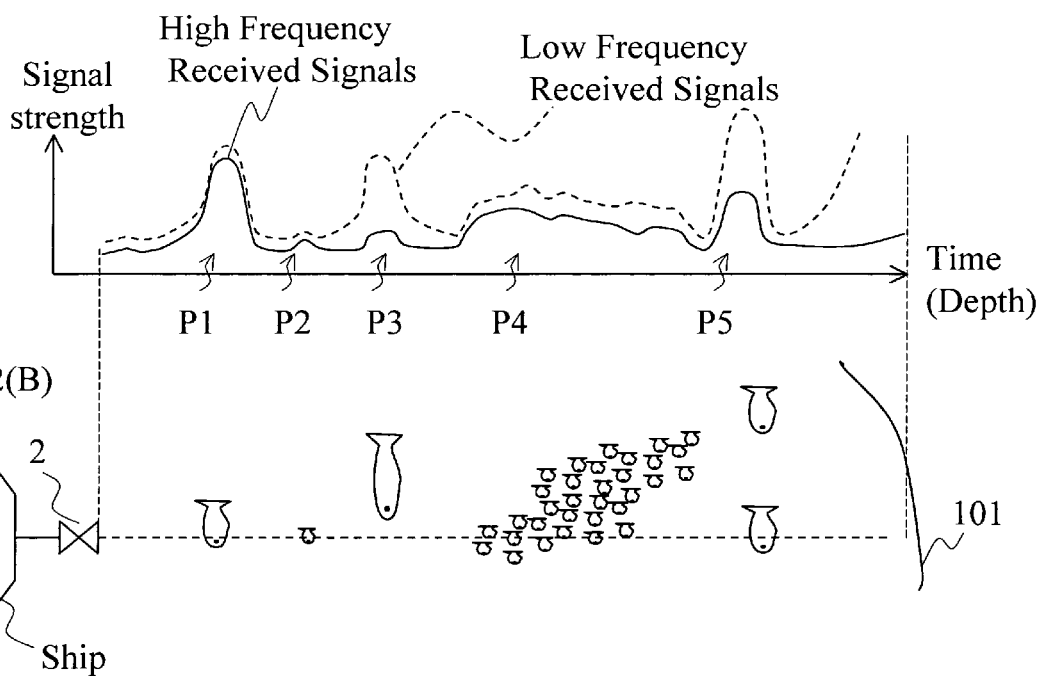
Fig.2(B)

Fig.4
Fig.4 (A)
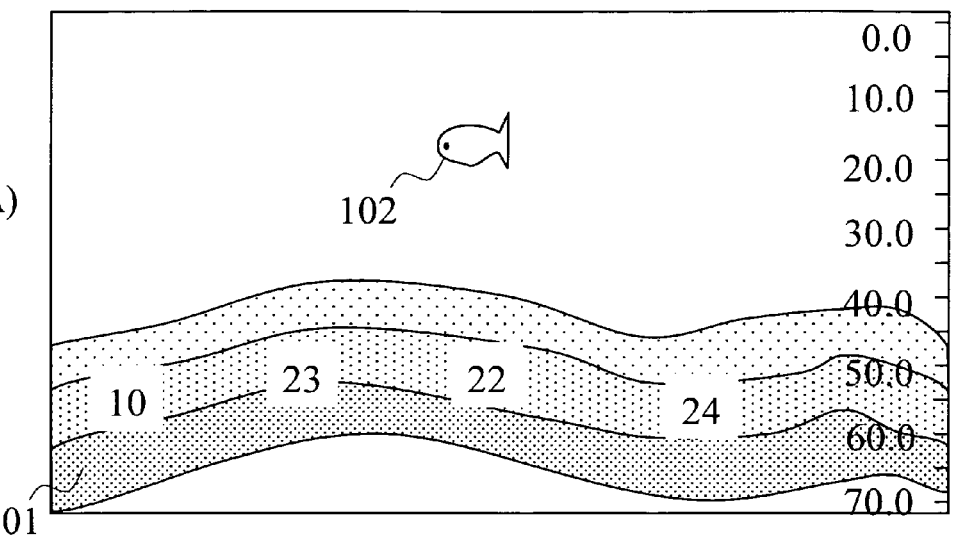
Fig.4 (B)
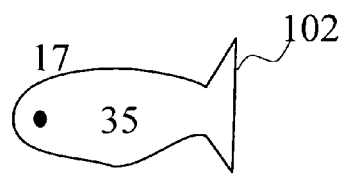
Fig.4 (C)
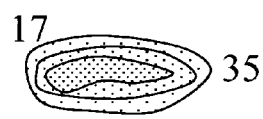

Fig.6
Fig.6 (A)
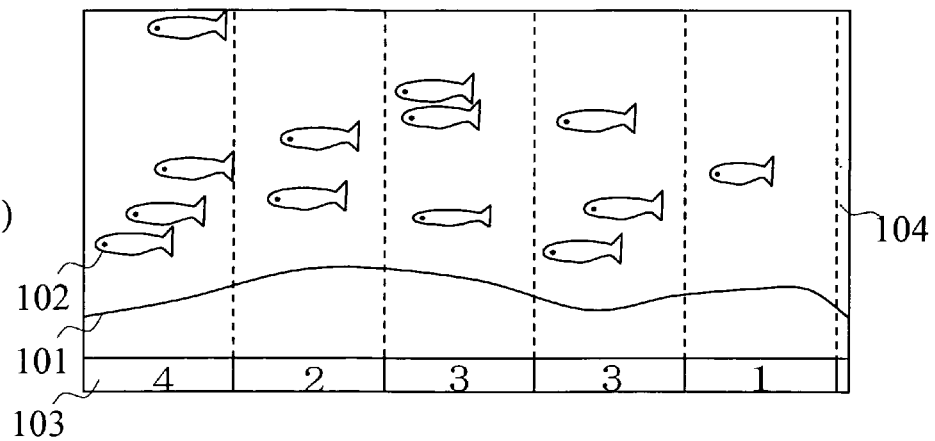
Fig.6 (B)
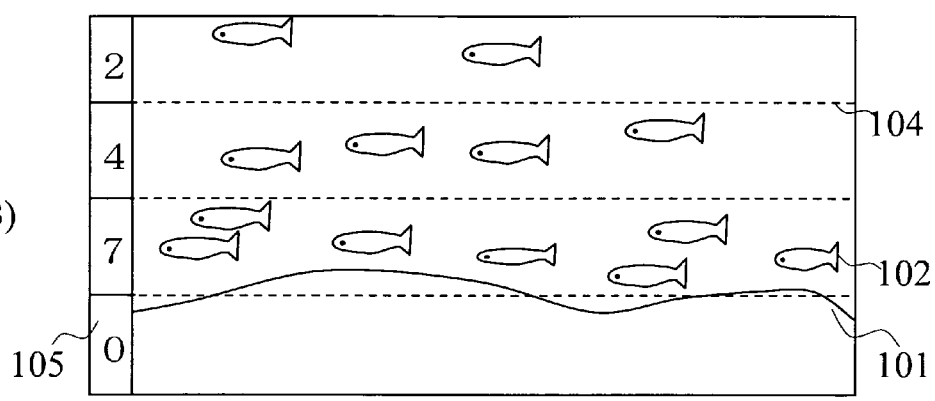
Fig.6 (C)
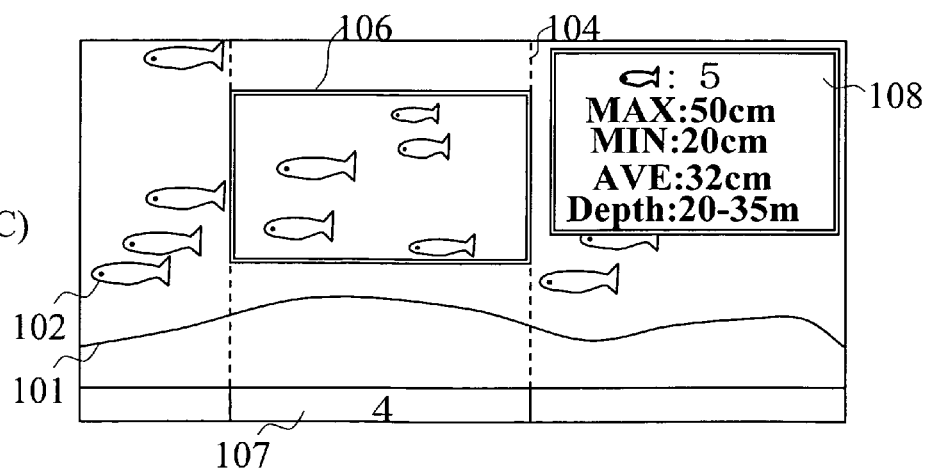

FISHFINDER

BACKGROUND OF THE INVENTION

The present invention relates to a fishfinder for identifying a single fish and for measuring the length of a fish.

In general, there have been used in fishing vessels fishfinders displaying echo signals in colors depending on the signal strength of received echo signals on the two-dimensional screen of an indicator having two mutually perpendicular axes with one axis representing an elapsed time or a vessel travel distance and with the other axis representing water depth. An operator of a fishfinder looks at echo images displayed two-dimensionally on the screen of an indicator to grasp the signal strength of received echo signals respectively in relation to water depths thereof.

Japanese Laid-Open Patent Publication No. H04-339288 discloses a fishfinder for displaying fish-like mark representing a fish school with its mark size depending on the signal strength of a fish echo signal, as superposed on echo images. U.S. Pat. No. 6,628,569B1 discloses a fishfinder for displaying a fish-like mark and for indicating a numerical value representative of the water depth of a fish school in the proximity of an echo image thereof. When these displays presented by the fishfinders disclosed in the patent publications, an operator can instantly grasp the water depth at which a fish school is. However, these display methods could not display signal strengths of received signals precisely. The signal strength is determined based on Target Strength which is peculiar to each target and numbers of the targets. The length of a single fish can be estimated based on Target Strength thereof. Japanese Patent No. 2,883,679 discloses a fishfinder for measuring more precisely the target strength of a single fish. The fishfinder is comprised with a transmission and reception device having a narrow angle radiation characteristics and another transmission and reception device having a radiation characteristics a portion of which has a substantially equal sensitivity characteristics. There is used echo signals resulting from an ultrasound pulse transmitted in a narrow angle beam pattern to judge whether a target directly under the hull of a ship is a single fish or not. With a single fish determined, there is used an echo signal resulting from an ultrasound pulse emitted by the transmission and reception device having a radiation characteristics having a substantially equal sensitivity characteristics, which is in synchronism with the single fish echo signal resulting from an ultrasound pulse emitted by the transmission and reception device having a narrow angle radiation characteristics. The transmission and reception device having a substantially equal sensitivity characteristics in the radiation characteristics is complicated in construction and large in size. There is used only an ultrasound pulse transmitted from the transmission and reception device having a narrow angle radiation characteristics to distinguish a single fish. It will not be possible to determine whether a detected fish is directly under the hull of a ship or is horizontally away from a vertical imaginary plane passing through a straight line connecting the bow and the stern of the ship. There have been misinterpretations in determining a single fish of a school of fish. The fishfinders described in these patent documents obtain target strength of a single fish based on echo signals received by a special ultrasound transducer having a substantially equal sensitivity characteristics in the radiation characteristics requiring no error corrections. However, with the fishfinders described in the above patent publications, it has been necessary for an operator to distinguish a single fish and to estimate the length of a fish which requires sophisticated knowledge and many experiences. The applicant filed a Japanese patent application about a fishfinder for identifying a single fish and measuring the length of a fish (refer to Japanese Patent Laid-Open No. 2005-249398). With this fishfinder, it collects statistics about a plurality of fishes in an area selected by an operator, and a histogram in terms of fish lengths is drawn. The display has enabled an operator to grasp fish length distribution of single fishes in the area selected.

In distinguishing a single fish or in measuring target strength or in measuring the length of a single fish, prior art fishfinders have mistaken, in some cases, a fish school for a single fish and vice versa. In such cases, there has not been measured with high precision target strength of a single fish or the length of a single fish. Further, in order to measure target strength of a single fish or the length of a fish without having sensitivity adjustments made, it has been necessary to use a special transmission and reception device complicatedly constructed and being large in size and having an equal sensitivity directional pattern over an azimuthal range. The conventional display method displays fish length distribution of single fishes in each area. It has been difficult to grasp a fish location and a fish length instantly.

SUMMARY OF THE INVENTION

An object of the present invention is to provide a fishfinder which is capable of distinguishing a single fish with high precision and providing an echo display enabling an operator to instantly grasp the water depth of a single fish and the length of a fish and information relating to the fish length, without using expensive and complicatedly constructed special units and without any sensitivity adjustments required.

A feature of the present invention is to provide a detector which comprises a transmission and reception device for transmitting into the water ultrasound pulses and receiving echo signals, a single body echo detector for distinguishing a single body echo based on echo signals received, and a single body echo tracker for tracking a single body distinguished by the single body echo detector for consecutive plurality of transmissions.

A fishfinder according to the present invention comprises a transmission and reception device for transmitting a first ultrasound pulse and receiving echo signals in a narrow beam form and for transmitting a second ultrasound pulse and receiving echo signals in a broad beam form, a single body echo detector for distinguishing a single body echo such as a single fish echo based on echo signals received, a single body echo tracker for tracking a single body distinguished by the single body echo detector for consecutive plurality of transmissions, and a fish length detector for measuring the length of a single fish. Thus, according to the invention, a fish length can be measured based on echo signals from a single fish identified with high accuracy. Echo signals coming from substantially the same depths and successively received are detected and tracked so that a single fish can be distinguished with high accuracy. The length of a fish can be measured based on signal strength of a received echo signal from a single fish tracked and received. Thus, according to the invention, a fish length can be measured based on an echo signal from a single fish identified with high accuracy.

With a fishfinder according to the present invention, for example, there are used an ultrasound pulse emitted in a broad transmission beam pattern and an ultrasound pulse emitted in a narrow transmission beam pattern. There are used received signal strength ratio of an echo corresponding to a broad radiation characteristics to an echo corresponding to a narrow radiation characteristics and an ultrasound pulse having a broad radiation characteristics a portion of which has substantially the same sensitivity to obtain target strength of a target with high precision. Thus, according to the invention, there can be distinguished a single fish directly under the hull of a ship precisely and target strength of the single fish can be measured with high precision. Further, the length of a single fish can be measured with high precision based on the target strength obtained. Details thereof will be explained hereinafter. With the signal strength ratio, a difference of signal strengths may be used.

A feature of the single body detector according to the invention is to detect a single body echo based on received echo signals resulting from an ultrasound pulse emitted in a broad transmission beam pattern and from an ultrasound pulse emitted in a narrow transmission beam pattern. Further, the single body echo detector detects a single body echo signal when it meets conditions that a received signal strength ratio of an echo signal resulting from an ultrasound pulse emitted in a broad transmission beam pattern to an echo signal resulting from an ultrasound pulse emitted in a narrow transmission beam pattern is within, a predetermined range and that the amplitude of an echo signal resulting from an ultrasound pulse emitted in a narrow transmission beam pattern rises and falls according to given conditions. For example, with a single fish being horizontally away from a vertical plane passing through a straight line connecting the bow and the stern of a ship, the signal strength of an echo signal resulting from an ultrasound pulse emitted in a narrow transmission beam pattern will be small with respect to the signal strength of an echo signal resulting from an ultrasound pulse emitted in a broad transmission beam pattern, and thus a signal strength ratio thereof will be out of a given range.

Accordingly, there can be prevented a detection of a single fish which is horizontally away from a vertical plane passing through a straight line connecting the bow and the stern of a ship by not using a received signal having a signal strength ratio outside of the given range. With echo signals not from a single fish but from a school of fish, there are some cases that the amplitude of received signals rises and falls gradually respectively. Therefore false detection of a school of fish can be prevented by not using a received signal the amplitude of which rises and falls gradually in detecting an echo signal from a single fish. Thus, identification accuracy of a single fish is raised, and a fish length can be measured with high precision.

When there are a plurality of single fishes at the same water depth, echo signals generated at the depth and resulting from an ultrasound pulse emitted in a broad transmission beam pattern are combined so that the signal strength thereof will be extremely large when detected. Thus, the target strength of a single fish or a fish length cannot be measured based on received echo signals resulting from an ultrasound pulse emitted in a broad transmission beam pattern. When there are a plurality of single fishes at the same depth, incorrect target strength measurements or incorrect fish length measurements can be prevented by not using a received echo signal having a signal strength ratio outside of a predetermined range in detecting a single fish. According to the present invention, the degree of distinguishing a single fish can be raised, and a fish length can be measured with high precision. Further, if a relative signal strength ratio is used, a single fish with a weak target strength will be detectable. Further, a fish length measuring means according to the present invention measures the length of a fish based on signal strength of received echo signals resulting from an ultrasound pulse emitted in the broad transmission beam pattern corresponding to the single body echo signal which has been tracked by the single body track means.

Directly under the hull of a ship, an ultrasound pulse emitted in a broad transmission beam pattern propagates with less attenuation as compared to an ultrasound pulse emitted in a narrow transmission beam. It is almost not necessary to make complicated adjustments in obtaining a target strength. A single fish echo signal having the highest signal strength is derived from the single body echo signals having been tracked. Based on a signal strength of an echo signal resulting from an ultrasound pulse emitted in a broad transmission beam pattern and received at the same time instant as the single fish echo signal, a target strength and a fish length are calculated. A prior art technique disclosed in U.S. Pat. No. 6,628,569B1 may be used to calculate a target strength and a fish length.

With the transmission and reception device according to the invention, there are provided with the broad angle radiation characteristics and the narrow angle radiation characteristics. Thus, only one transmission and reception device will be necessary so that the construction of a fishfinder will be simpler and a fishfinder is presented at a lower price. When one transmission and reception device is used, there are emitted alternately an ultrasound pulse having the broad radiation characteristics and an ultrasound pulse having the narrow radiation characteristics. If there are used a transmission and reception device emitting an ultrasound pulse having a high carrier frequency and another transmission and reception device emitting an ultrasound pulse having a low carrier frequency, the two ultrasound pulses can be transmitted simultaneously.

A fishfinder according to the invention is comprised with a single fish data displaying means for indicating at least either of the length of a fish or the depth of a fish at a position or in the proximity of the single fish displayed on the screen of an indicator. Thus, an operator can grasp individual single fishes and relevant data thereof without having sophisticated knowledge and many experiences. A fishfinder according to the invention displays a mark representing a single fish depending on the length of a single fish at a position of the single fish displayed on the screen of an indicator. Thus, an operator can grasp individual single fishes and relevant data thereof without having sophisticated knowledge and many experiences. A fishfinder according to the invention displays data relating to a single fish in a form of bar moved in synchronism with an update of the elapsed time or travel distance. Thus, an operator can grasp various data about single fishes in a predetermined area of the sea instantly without needing sophistication and many experiences.

It is preferable that water areas are divided into ones corresponding to time intervals of, for instance, 10 seconds, or corresponding to distance intervals such as 100 m and that there is collected statistics on counted numbers of single fishes, average fish length, maximum fish length and the water depth of a single fish having a maximum fish length in each divided water area which are to be displayed on a display bar. Time or distance intervals to divide an area of the sea should be set at intervals an operator desires. A fishfinder according to the invention displays the bar display or the mark display in a manner depending on such data as a counted number of single fishes, a mean fish length, a maximum fish length or a depth of a single fish having the maximum fish length which are obtained by collecting statistics about a plurality of single fishes so that an operator can intuitively and visually grasp the data.

Further, the fishfinder according to the invention is provided with an alarm output means for producing at least one of an alarm sound, an alarm display, or preset sound or image data if conditions predetermined by an operator are met by the single fish data, the mark display information or the bar display information. For example, when there is displayed a single fish having its length as more than 50 centimeters, brilliance of the screen may be changed in addition to sounding a preset warning. It is also possible to produce data such as favorite voices or images for an operator having been memorized by a fish finder. This enables an operator to instantly grasp information about a single fish in a given area, even if an operator's attention is off the screen of an indicator.

The fishfinder according to the invention is provided with transmitting and receiving means for emitting a single ultrasound pulse into the water and receiving echoes resulting from the ultrasound pulse to produce reception signals, single body echo detecting means for identifying a single body echo and for measuring the depth of the single body, single body echo tracking means for continuously tracking in a depth direction the single body echo signals identified by the single body echo detecting means during the transmission and reception periods for repeatedly transmitting and receiving ultrasound signals by means of the transmitting and receiving means and fish length detecting means for measuring the length of a fish tracked based on signal strengths of received signals corresponding to the single body echo signals. Thus, according to the invention, a fish length can be measured based on an echo signal from a single fish identified with high accuracy. Echo signals coming from substantially the same depths and successively received are detected and tracked so that a single fish can be distinguished with high accuracy. Based on the signal strength of single fish echo signals, a fish length measurement can be performed. With a fishfinder according to the invention, without using two transmission and reception devices having respective different transmission beam patterns, there is used a simple and inexpensive transmission and reception device for transmitting an ultrasound pulse. According to the invention, the length of a single fish can be measured with high precision based on received echo signals from the single fish and distinguished precisely by means of a transmission and reception device for transmitting an ultrasound pulse which is simply constructed and of low price.

According to the present invention, accuracy for distinguishing a single fish with a fishfinder can be raised. The length of a single fish can also be measured precisely. Further, an operator is capable of with ease distinguishing a particular single fish from other fishes in terms of position and fish length on the screen of an indicator and of grasping the depth and length of a single fish. Even if the screen of the indicator is not observed attentively, it is possible to obtain information relating to the length of a fish in a particular area.

BRIEF DESCRIPTION OF THE DRAWINGS

FIG. 2 shows diagrams for explaining processing to detect a single fish directly under the hull of a ship;

FIG. 4 shows a display example presented by a fish finder according to the first embodiment of the invention;

FIG. 6 shows diagrams for explaining a fish finder according to a second embodiment of the invention;

DESCRIPTION OF THE PREFERRED
EMBODIMENTS OF THE INVENTION

Figure 1:
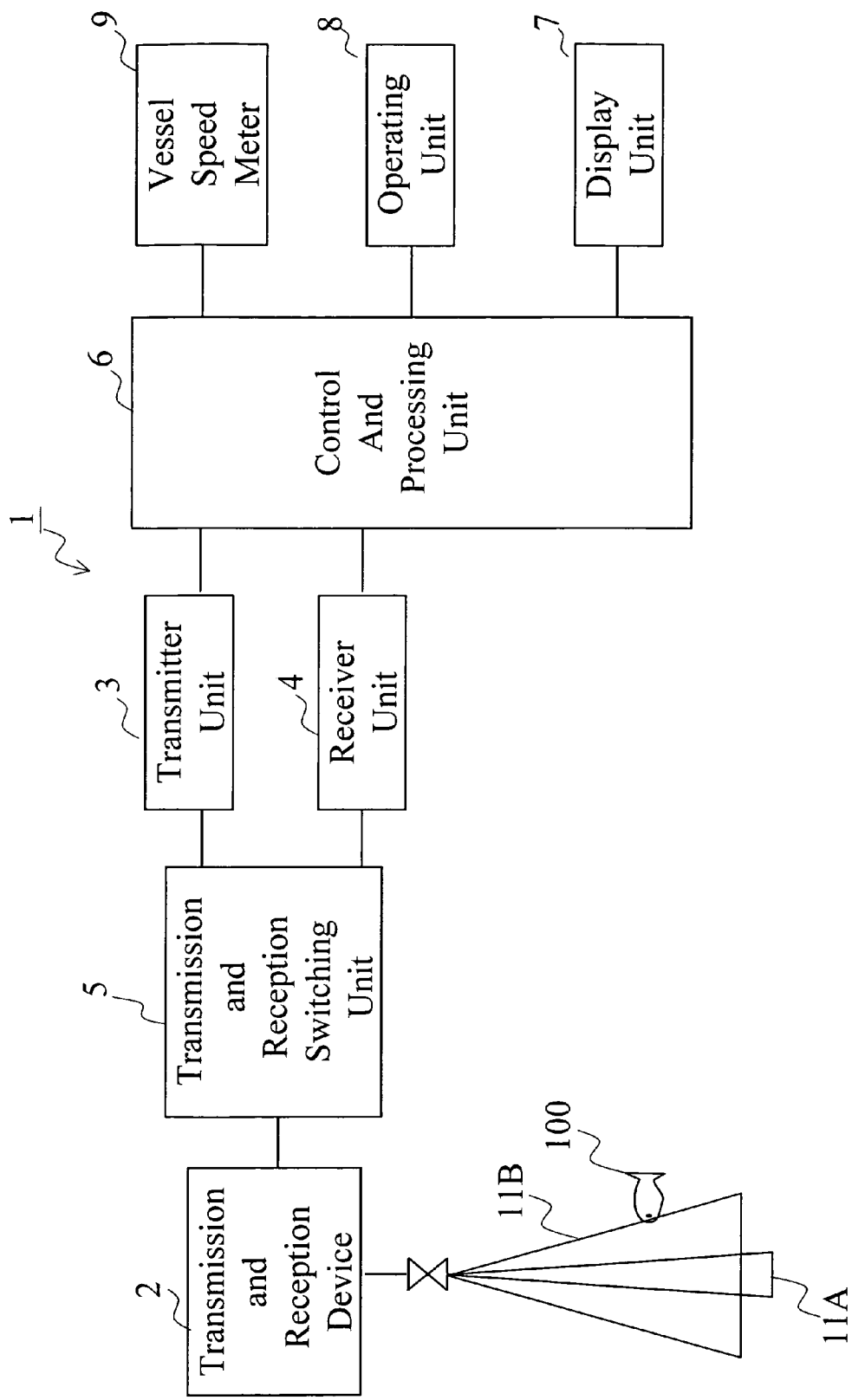
FIG. 1 shows a block diagram of a fish finder according to a first embodiment of the invention.

Referring to FIG. 1 through FIG. 4, there will be explained hereinafter a fishfinder according to a first embodiment of the invention. FIG. 1 is a block diagram showing an arrangement of an embodiment of a fishfinder according to the present invention. A fishfinder 1 is comprised with an ultrasound transmission and reception device 2, a transmitter unit 3, a receiver unit 4, a transmission and reception switching unit 5, a control and processing unit 6, a display unit 7, an operating unit 8 and a vessel speed meter 9. The ultrasound transmission and reception device 2 comprises a transducer which is capable of resonating at a high frequency and a low frequency and transmits alternately an ultrasound pulse 11A having a high carrier frequency and an ultrasound pulse 11B having a low carrier frequency and receives an echo signal having a high carrier frequency produced by a single fish 100 and an echo signal having a low carrier frequency produced thereby. The ultrasound transducer of the ultrasound transmission and reception device 2 has a vertical downward narrow directional characteristics with respect to the hull of the ship for a high frequency ultrasound pulse 11A and a vertical downward broad directional characteristics with respect thereto for a low frequency ultrasound pulse 11B. The high frequency ultrasound pulse 11A has higher detectability in searching targets such as a single fish under the ship. The ultrasound pulse 11B having a low carrier frequency has broad directional characteristics and has low ultrasound propagation loss. As shown in FIG. 1, the sensitivity of an ultrasound pulse having a low carrier frequency is substantially the same at a portion of the characteristics of the ultrasound pulse having a low carrier frequency overlaps with the ultrasound pulse having a high carrier frequency under the ship. Thus, it will not be necessary to correct the signal strength of received signal in obtaining target strength thereof. The transmitter unit 3 is comprised with a transmission pulse generating circuit and an oscillation output circuit. The transmission pulse generating circuit produces pulse signals for driving the transmission and reception device 2 at predetermined time intervals as shorter than one second period and supplies the pulse signals to the transmission and reception switching unit 5. The transmission and reception switching unit 5 is controlled by the control and processing unit 6 to change one connection between the transmission and reception device 2 and the transmitter unit 3 and the other connection between the device 2 and the receiver unit 4 for emitting pulse signals and receiving echo signals. The receiver unit 4 is comprised with two narrow band filters having bandwidths for passing echo signals having frequencies with a high resonance frequency of the transmission and reception device 2 at their center frequency and for passing echo signals having frequencies with a low resonance frequency of the device 2 at their center frequency, amplifiers and analog/digital conversion circuits respectively. The receiver unit 4 eliminates noises from echo signals received by the transmission and reception device 2 and derives high frequency reception signals and low frequency reception signals which are amplified and digitized respectively. Resultant digitized high frequency received signals and low frequency received signals are supplied to the control and processing unit 6 respectively. The control and processing unit 6 is comprised with a central processing unit (CPU), a memory device and an interface coupled to an external device, and performs arithmetic and control operations. With the control and processing unit 6, the CPU performs arithmetic operations based on kinds of control programs having been stored in the memory device. Switching signals are also supplied from the control and processing unit 6 to the transmission and reception unit 5 at predetermined time intervals. Further, there are performed processes to detect echoes, to detect depths of targets, to distinguish a single fish, to measure the length of a fish, and to display images on the screen of an indicator.

The echo detection processing detects echoes from targets based on high frequency received signals and low frequency received signals supplied from the receiver unit 4. The depth detection processing calculates the depth of a target corresponding to a time from an emission of ultrasound pulse to a reception of a resultant echo. The processing to distinguish a single fish operates in such a way that ultrasound pulses are emitted and received repeatedly at predetermined time intervals, and echoes having a high carrier frequency resulting from the ultrasound pulses appearing at substantially the same depth are judged as ones from the same single fish. The fish length measuring processing operates in such a way that a single fish is considered to be in an area directly under the hull of a ship when an echo having the biggest peak signal strength is obtained from echoes resulting from successive emitted ultrasound pulse signals, and a target strength is calculated based on at least a low frequency received signal. The length of a single fish will be calculated based on the target strength obtained. Accordingly, target strength is obtained with high accuracy from low frequency signal strength requiring no corrections. Thus, the length of the single fish can be obtained with high precision. The image display processing generates echo images in different display ways depending on a single fish and the length of a fish, which are displayed on the screen of the display unit 7. It is to be noted that there are shown an example for the processing performed by the control and processing unit 6 comprising a software. It is also possible to use a hardware to conduct the same processing. The display unit 7 is comprised with a liquid crystal display, and displays echo images on the screen of an indicator. The operation unit 8 accepts operational inputs from an operator. The vessel speedometer 9 detects the speed of own ship.

With the construction as explained above, a fishfinder 1 according to an embodiment of the present invention is simply arranged as including a single transmission and reception device 2, and distinguishes a single fish with high accuracy and measures the length of a fish with high precision. An echo picture will be displayed based on the detections and measurement results. With the embodiment of the invention, the ultrasound transmission and reception device 2 comprises a transducer which is capable of resonating at a high frequency and a low frequency and transmits alternately an ultrasound pulse 11A having a high carrier frequency and an ultrasound pulse 11B having a low carrier frequency. It is also possible to use a combined drive pulse signal including a drive signal for a high frequency ultrasound pulse 11A and another drive signal for a low frequency ultrasound pulse 11B generated by the transmitter unit 3 so that the ultrasound transmission and reception device 2 emits into the water a high frequency ultrasound pulse 11A and a low frequency ultrasound pulse 11B simultaneously. In this case, the receiver unit 4 will be of a broad band type, and the control and processing unit 6 is provided with means for filtering frequency components to derive desired frequency signals.

Hereinafter, there will be explained more in detail the processing performed by the control and processing unit 6. At first, the echo detection processing will be explained. FIG. 2(A) shows a waveform of a received signal. FIG. 2(B) shows signal strengths of high frequency received signals and low frequency received signals caught by the transmission and reception device 2. And the relationship between distribution of fishes and the signal strengths are also illustrated. The vertical axis of each of the graphs represents signal strength, while the horizontal axis thereof represents time. It is to be noted here that oscillation lines are omitted. With the echo detection processing, received signals satisfying the following conditions are distinguished as echoes from a single fish. A first condition is that the signal strength ratio of a high frequency received signal to a low frequency received signal is within a range between the upper limit and the lower limit. This condition can be expressed as in the following.

$$L1\ min < Whigh/Wlow < L1\ max$$

"Whigh" is the signal strength of a high frequency received signal, and "Wlow" is the signal strength of a low frequency received signal. "L1 min" is the lower limit of the signal strength ratio, and "L1max" is the upper limit of the signal strength ratio. "L1min" and "L1max" are in prepared values. With this condition, there are removed a wave portion represented as P3 and another wave portion P5 where the signal strengths of low frequency received signals are higher values than a predetermined value respectively. With the waveform portion P3 resulting from echo signals produced by a single fish which is at a position horizontally apart from a vertical plane going through an imaginary straight line between the bow and the stern of the fishing vessel, the signal strength of a high frequency received signal is smaller than the signal strength of a low frequency received signal and a signal strength ratio of high frequency signal to low frequency signal will be smaller than the lower limit. Thus, a detection of a single fish which is not in an area directly under the ship can be prevented by not using such a waveform portion having the above signal strength ratio for detecting a single fish. With the waveform portion P5, a signal strength of a high frequency received signal from a single fish is higher and signal strength of low frequency received signals from a plurality of fishes at the same water depth becomes higher. In this case, the signal strength of a low frequency received signal is extremely bigger than the signal strength of a high frequency received signal. The signal strength ratio of the high frequency signal to the low frequency signal will be smaller than the lower limit. Thus, there can be prevented a detection of a single fish, the target strength of and the length of the single fish which are not measured precisely by removing the waveform portion having the above signal strength ratio in detecting a single fish. A second condition is that a signal strength of a received signal is bigger than the predetermined threshold value. This condition can be expressed as in the following equation.

$$W > Wlimit$$

"W" represents signal strength of a high frequency received signal or signal strength of a low frequency received signal. "Wlimit" is the threshold value of the signal strength. It is preferable to lower the threshold value in such a degree that noises can be eliminated. A third condition is that a signal strength of a high frequency received signal rises over a given range within a given time, and then falls over a given range within a given time. Referring to FIG. 2(A), the third condition will be explained. The relationship between signal strength and time is illustrated with a curved line. A signal strength W0 at a time instant T0 rises and reaches a signal strength W1 at a time instant T1 coming after the time instant T0. Thus, signal strength has increased by (W1-W0) for a time period (T1-T0). Then, a signal strength W2 at a time instant T2 falls and reaches a signal strength W3 at a time instant T3. Thus, signal strength has decreased by (W2-W3) for a time period (T3-T2). There will not be used in detecting single fish the signal strengths other than the portion of the line representing signal strength corresponding to the time period between the time instants T1 and T2. For example, a waveform part represented by P4 is obtained in response to echoes from a school of fish. The waveform part P4 in FIG. 2(B), in many cases, does not satisfy the third condition. Since the leading and trailing portions of the waveform due to a school of fish are moderately curved, misdetections in detecting a single fish can be reduced by using this condition. Referring to FIG. 2(A), a fourth condition is that a waveform part derived in accordance with the third condition, i.e., the time period (T2-T1) is shorter than a predetermined time period (T). This condition can be expressed as in the following.

$$T2-T1<T$$

This condition removes a waveform part corresponding to the time period (T2-T1) which lasts longer than the time period (T) in detecting a single fish. For example, a waveform part is obtained by receiving echoes from a school of fish spreading over a depth range of a few meters. Thus, the condition limiting the depth range with an upper limit reduces misdetections to mistake a fish school for a single fish. With this embodiment according to the invention, a waveform part satisfying all the above conditions is considered to be obtained in response to a single fish. For example, waveform portions P1 and P2 in FIG. 2(B) are obtained by echoes from single fishes respectively. With the above-explained conditions used, a single fish can be detected more accurately as compared with the methods having been conventionally used. Further, there can be detected accurately as a single fish even if the magnitude of a signal strength waveform portion P2 is small.

Figure 3:
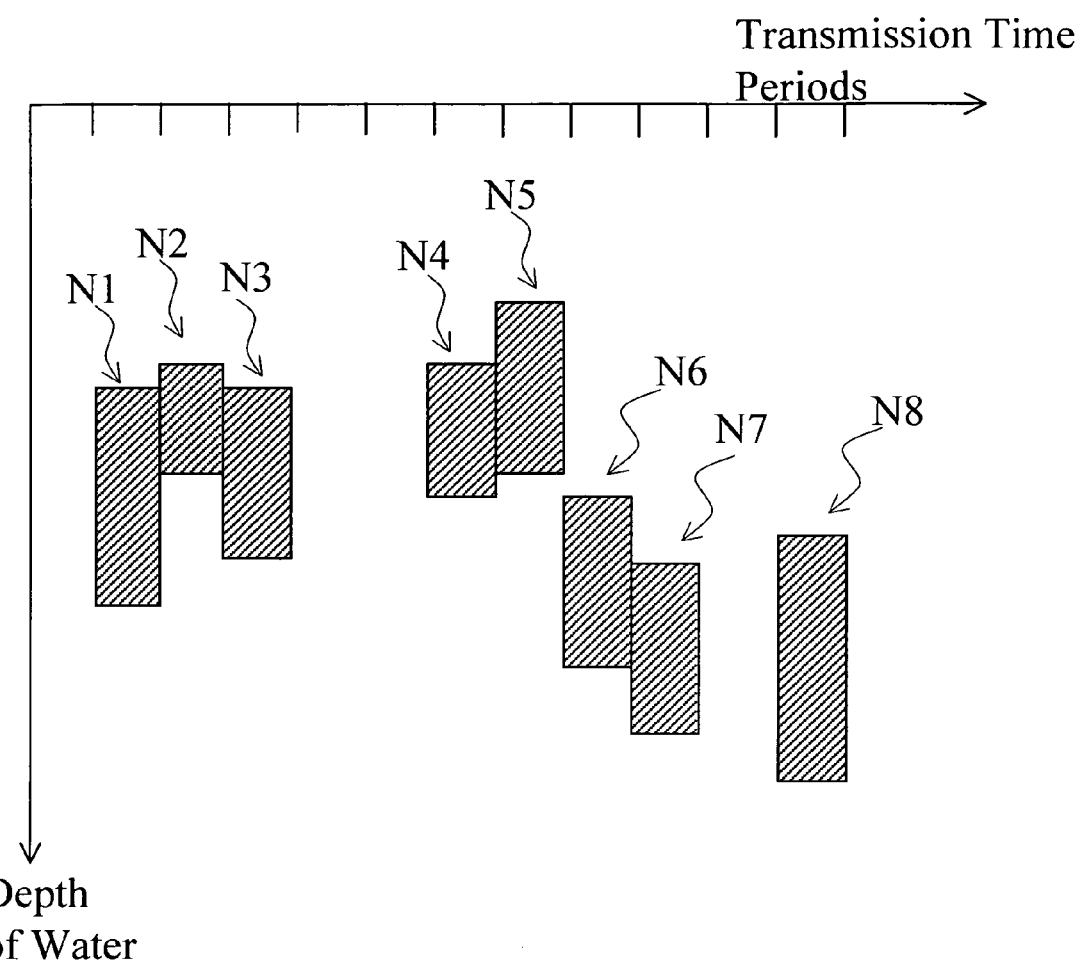
FIG. 3 shows a diagram for explaining a way to track echoes from the same single fish.

Next, a processing for detecting a single fish will be explained hereinafter. With this embodiment, among single fish echoes distinguished repeatedly and at predetermined time intervals, echoes from the same single fish are selected and tracked. If a depth range of a single fish echo having a high carrier frequency and received overlaps a depth range of a single fish echo immediately previously received, the single fish echoes are considered to be from the same single fish. FIG. 3 is a drawing for explaining a method of tracking received echoes of a single fish. In FIG. 3, the vertical axis represents depth of the water, the lower along the axis the deeper in water depth. The horizontal axis represents transmission time periods. Echoes resulting from a newer transmitted ultrasound pulse are displayed in the right-hand side, echoes resulting from an older transmitted ultrasound pulse are displayed in the left-hand side. It is to be noted that all the single fish echoes represented by symbols N1 through N8 in FIG. 3 satisfy all the conditions from the first through the fourth explained above.

Here, a depth range for a single fish echo N2 and a depth range for a single fish echo N1 overlap each other, while a depth range for a single fish echo N3 and a depth range for a single fish echo N2 overlap each other. Thus, it will be considered that there are obtained from the same single fish the single fish echo N1, the single fish echo N2 and the single fish echo N3.

With the single fish echo N3 and a single fish echo N4, the depth ranges for the respective echoes overlap each other, there are two transmission periods therebetween having no echoes received. If echoes are not received during a plurality of successive transmission periods, it is determined that a single fish has not been tracked or a single fish has gone out of an area directly under the hull of a ship to stop the tracking of a fish.

As a single fish echo N4 and another single fish echo N5 overlap in a depth range, it is determined that the echoes have come from the same single fish. While, since a single fish echo N5 and another single fish echo N6 do not overlap in a depth range, it is determined that the echoes have come from different single fishes respectively. With a depth range for the single fish echo N5, echoes are not received during more than two successive transmission periods, it is determined that the tracking of a fish should be stopped.

As a single fish echo N6 and another single fish echo N7 overlap in a depth range, it is determined that the echoes have come from the same single fish. No echoes have been received during one transmission period between a single fish echo N7 and another single fish echo N8. Since a depth range for the echo N7 and a depth range for the echo N8 overlap, it will be determined that the echoes have come from the same single fish. Thus, it is considered that the single fish echoes N6, N7 and N8 have come from the same single fish and received. After having detected the single fish echo N8, the single fish will be tracked till single fish echoes are not received in succession for a plurality of transmission periods.

While a plurality of single fishes are followed, if it is observed that they intersect at a point, the single fish echo at the point should be excluded. In this way; an incorrect measurement of fish length can be prevented.

When other abnormal single fish echoes than the cases explained above are observed, the single fish echo may be excluded. For example, the depth of a boundary surface of the sea bottom is first measured. When a single fish echo exceeds the measured depth of the bottom, a single fish tracking processing may be conducted to exclude the single fish echo. As a method for measuring a boundary surface of the bottom in such cases, a general well-known method should be used.

Next, a fish length measurement method will be hereinafter explained.

With this embodiment, there is taken the ratio of a peak signal strength of high frequency received signal to a peak signal strength of low frequency received signal about each of the single fish echoes N1 through N3, for example, shown in FIG. 3 which result from the same single fish. A single fish echo satisfying the following predetermined condition below is selected.

$$L2\ min<Whighpeak/Wlowpeak$$

"Whighpeak" is a peak signal strength of a high frequency reception signal, and "Wlowpeak" is a peak signal strength of a low frequency reception signal. "L2 min" is the lowest value of the signal strength ratio at a time when a single fish echo is selected. Low frequency reception signals received at the same time instant as the selected single fish echo are read out. Based on at least the one low frequency reception signal, a target strength TS and a fish length L will be calculated. It is to be noted that there may be used a prior art technique described in U.S. Pat. No. 6,628,569B1 to calculate a target strength TS and a fish length L. For example, when single fish echoes satisfying the predetermined conditions are N1 and N2, peak signal strengths of low frequency received signals of N1 and N2 are compared. If a peak signal strength of low frequency received signal N2 is stronger, a target strength TS and a fish length L are calculated based on the peak signal strength of low frequency received signal strength of N2. This way of calculation comes from a consideration that an ultrasound pulse having a high carrier frequency having a narrow angle of radiation characteristics cannot be emitted in a vertical downward direction with respect to the hull of a ship due to ship's movements affected by winds or waves. Thus, the signal strength of received signals from a single fish in an area directly under the hull of a ship will be weaker so that the precise position of a single fish cannot be grasped. However, if effects due to winds and waves are negligible or fish finders comprised with means for correcting unstable movements are used, a single fish echo having the highest peak signal strength of high frequency received signals may be selected to calculate the length of a fish. A low frequency received signal received at the same timing as the single fish echo is read out. Target strength TS and fish length L are calculated based on the peak signal strength of the low frequency received signal. A prior art technique disclosed in U.S. Pat. No. 6,628,569B1 may be used to calculate a target strength and a fish length.

Next, the raster display processing will be explained hereinafter. FIG. 4(A) shows an example of an echo picture. With this echo picture, the vertical axis represents depth, and the horizontal axis represents elapsed time. Signals strengths of high frequency received signals are displayed in colors. There are displayed as superposed thereon numerals representing sediments of the sea bottom 101 and a single fish mark 102. The control and processing unit 6 displays in the rightmost vertical line echoes resulting from the latest transmission and reception of ultrasounds in synchronism with transmissions and receptions at predetermined time intervals. The displayed picture is moved from the right to the left. Single fish echoes are tracked. A single fish mark 102 is placed on an echo with which a fish length is measured. One single fish mark 102 represents one single fish. With this echo picture, only one single fish 102 is displayed. If a plurality of single fishes are distinguished, single fish marks are displayed at respective positions. FIG. 4(B) shows display examples of the single fish mark 102. A single fish mark 102 uses a symbol of a fish. A fish length L (35 cm) is numerically displayed as superposed on the single fish mark 102. Numerical indication of its depth (17 m) is put in the proximity of the single fish mark. By referring to these displays, an operator of the fishfinder 1 can instantly grasp a location of fish 100 and fish length L, and depth thereof. It is to be noted that a depth scale is preferably displayed in place of numerical depth indications thereof. Indications of fish lengths may be omitted. In such cases, it is preferable to display the size of a single fish mark corresponding to the length of a fish. Further, when a plurality of single fishes are on the screen of an indicator, there may be displayed a single fish having the maximum length or a single fish an operator specified in a different manner from the one for other single fishes. For example, it is possible to display in different manners as the shape of a single fish mark, or color, plaited cover or line thickness of a mark changed. It can be distinguished from other single fishes with a blinking light or predetermined movements as bouncing. It may not be necessary to display the single fish mark 102. In this case, there may be used echo images colored depending on a signal strength of a single fish echo. A display example of a single fish echo for the above display method is shown in FIG. 4(C). It is preferable to numerically indicate a fish length and depth of a single fish in the proximity of the single fish echo so that an operator can grasp a location of the single fish and fish length and depth easily. A numerical indication of the depth may not be necessary. Instead, it is preferable to display a depth scale. There is shown an example for collecting statistics on a plurality of transmissions and receptions to provide a numerical indication of an average signal strength for the sea bottom so that an operator of fishfinder can easily grasp sediment of the bottom 101. This enables an operator to grasp sea bottom conditions such as sediment of the bottom, grittiness or form of stones. As one of display methods, it may display only a boundary line of the sea bottom. As explained above, as the length of a fish is numerically displayed at the location of an individual single fish or in the proximity thereof, an operator of fishfinder can easily recognize the location of a single fish and a fish length thereof and hence can instantly grasp which single fish is a big fish. It will be possible to easily grasp the location of and fish length of a single fish having a particular characteristics among many single fishes.

Figure 5:
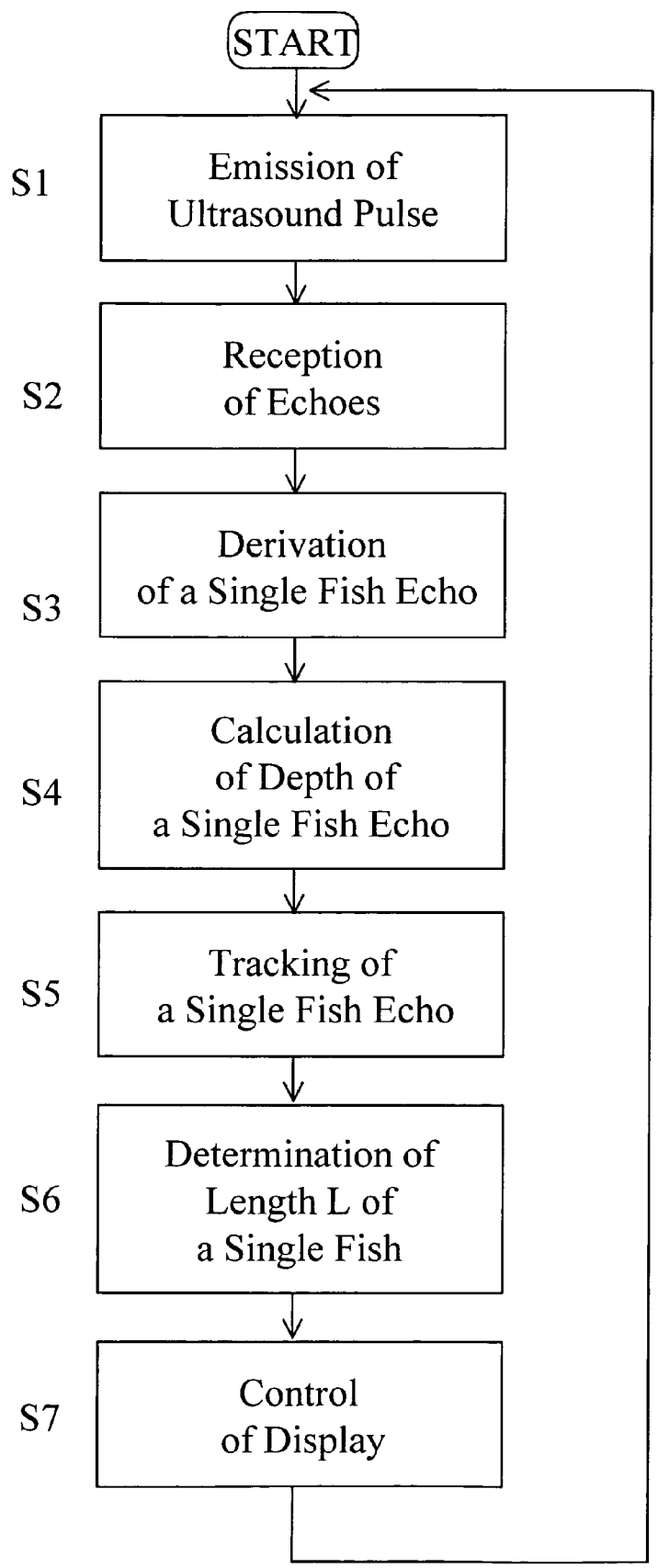
FIG. 5 is a flow chart for explaining the operation of a fish finder according to the first embodiment of the invention.

Next, operations of the fishfinder 1 will be explained by referring to a flow chart shown in FIG. 5. At first, the transmission and reception device 2 emits an ultrasound pulse of a high carrier frequency and an ultrasound pulse of a low carrier frequency into the water (S1). Next, the transmission and reception device 2 receives echoes reflected by a single fish 100 and other obstacles.(S2). There are derived high frequency reception signals and low frequency signals as shown in FIG. 2(B). Echoes are derived in accordance with the first through the fourth conditions (S3). Depths of echoes are calculated respectively (S4). As it is detected that depth ranges of single fish echoes identified in reception signals for respective transmission and reception intervals are substantially continuous, the same single fish is tracked (S5). With single fishes tracked, a target strength TS and the length L of a single fish are determined based on low frequency reception signals from a single fish at a position closest to the vertical plane passing through a straight line connecting the bow and stern of the ship (S6). Echo images for a display corresponding to data for a single fish are generated and are displayed on an indicator (S7). A fishfinder having a comparatively simple construction to use a single transmission and reception device for emitting and receiving ultrasound signals respectively having two different frequencies, is capable of increasing resolution of single fish echoes to measure the length of a fish with high precision, by repeating the above operations. With a use of displays on the display unit 7, an operator of fishfinder can easily grasp the depth and the length of a single fish, and can visibly recognize the location and length of a single fish having a particular characteristics among many single fishes easily.

Next, a second embodiment of a fishfinder according to the present invention will be explained. FIGS. 6(A) through (C) show display examples of underwater echo images displayed on the indicator of the fishfinder as the present embodiment. The total construction of the fishfinder is similar to the fishfinder as the first embodiment. A control and processing unit 15 performs to count the number of single fishes in addition to the above processes. With this processing, an input specifying counting intervals is received from the operation unit 8. Vessel speed pulses are received from the vessel speed meter 9 to calculate a moved distance. A count signal is generated each time the count reaches the count interval specified by the operation unit 8. The number of single fishes accumulatively counted at the count intervals based on data obtained by tracking single fishes. With an image display processing, there are generated echo images to be displayed on the indicator 7. A display bar 103 is displayed as superposed on echo images, as a display example shown in FIG. 6 (A). The sea bottom 101 and a single fish mark 102 are combined with underwater echo images. With this example, a boundary line of the sea bottom is displayed as the sea bottom 101. A simple symbol of a single fish is displayed for the single fish mark 102. With this display example, a display bar 103 is provided. The displayed images are moved in synchronism with transmissions of ultrasound search pulses. The display bar is divided at intervals corresponding to predetermined counts into portions thereof. Data relating to single fishes are displayed in each of the portions. There may be omitted auxiliary lines 104 representing count intervals on the screen as set by an operator. There is provided a numerical indication of a counted number of single fishes obtained at count intervals and on which statistics is collected. Although it is not shown, divided portions of the display bar are indicated in colors and the colors are varied depending on average fish lengths obtained by collecting statistics at the count intervals. For example, a long average fish length is displayed with a high brilliance color, while a short average fish length is displayed with a low brilliance color. With use of the above method, an operator's recognition is raised so that he can instantly grasp the relevant data and can visibly recognize underwater conditions. It is to be noted that numerical indications and data displayed in colors are not limited to the counted number of single fishes and average fish lengths, and there may be used the maximum fish length or a depth of a single fish having the maximum fish length. With either one of the data, the display bar 103 is divided into portions, and respective portions are displayed in different display manners. As explained above, there are displayed on the display bar single fish information such as a counted number of single fishes, an average fish length, the maximum fish length and the depth of a single fish having the maximum fish length so that an operator can grasp the information easily. With horizontal intervals specified by an operator, the intervals are set as time intervals of every ten seconds, or as distance intervals of every 100 m while the ship is advancing. With the arrangement of a fishfinder as explained above, it will be easy for an operator to grasp distribution of single fishes in an area of the sea. Particularly, an operator can instantly grasp in which area of the sea big fishes are distributed over. An operator can easily and visibly recognize in which area of the sea there are single fishes having a particular characteristic. It is also preferable to display single fish mark 102 in different ways depending on a dimension of fish length. For example, the display size of single fish mark 102 may be determined depending on a corresponding fish length. In FIG. 6(A), a display bar is located at a lower part on the screen of an indicator. The display bar can be located at an upper part on the screen of an indicator. Further, as shown in FIG. 6(B), the display bar 105 may be located in the leftmost side portion and single fish information may be displayed at respective water depths. The display bar 105 may be located either one of the rightmost and the leftmost sides of the screen. It is also possible to provide display bars on both sides of the screen. With an area 106 specified by an operator, the single fish information may be displayed with a display bar 107 as in FIG. 6(C). It may be displayed in a single fish display portion 108 at an appropriate portion on the screen of an indicator. The display bar 107 shown in FIG. 6(C) may be displayed on both sides of the screen in the same way as in FIG. 6(B) depending on a depth range of the area 106 specified. In FIG. 6(C), there are displayed the number of single fishes in a specified area 106, a maximum of fish length and a minimum thereof, a mean fish length, the depth range of the specified area as an example of the single fish information. An operator selects the single fish information and data as fish length or depth of a fish to be displayed in the single fish information display space 108 of the display unit. There can be displayed simultaneously the display bar and the single fish information display space. Or each of the two displays may be indicated individually. Referring to FIGS. A(A) through 6(C), when a plurality of single fishes are on the screen of an indicator, there may be displayed a single fish having the maximum length or a single fish an operator specified in a different manner from the one for other single fishes. For example, it is possible to display in different manners as the shape of a single fish mark, or color, hatching or half-tone dot meshing or plaited cover, or line thickness of a mark changed. It can be distinguished from other single fishes with a blinking light or predetermined movements as bouncing. In the same way as FIG. 6(A), there may be omitted an auxiliary line 104 on the screen shown in FIGS. A(B) and 6(C) in response to an input by an operator. With the arrangement of a fishfinder, it will be possible to display depending on objects desired by an operator various kinds of single fish information such as in the neighborhood of the sea bottom or at depths where specific kinds of fishes are.

Figure 7:
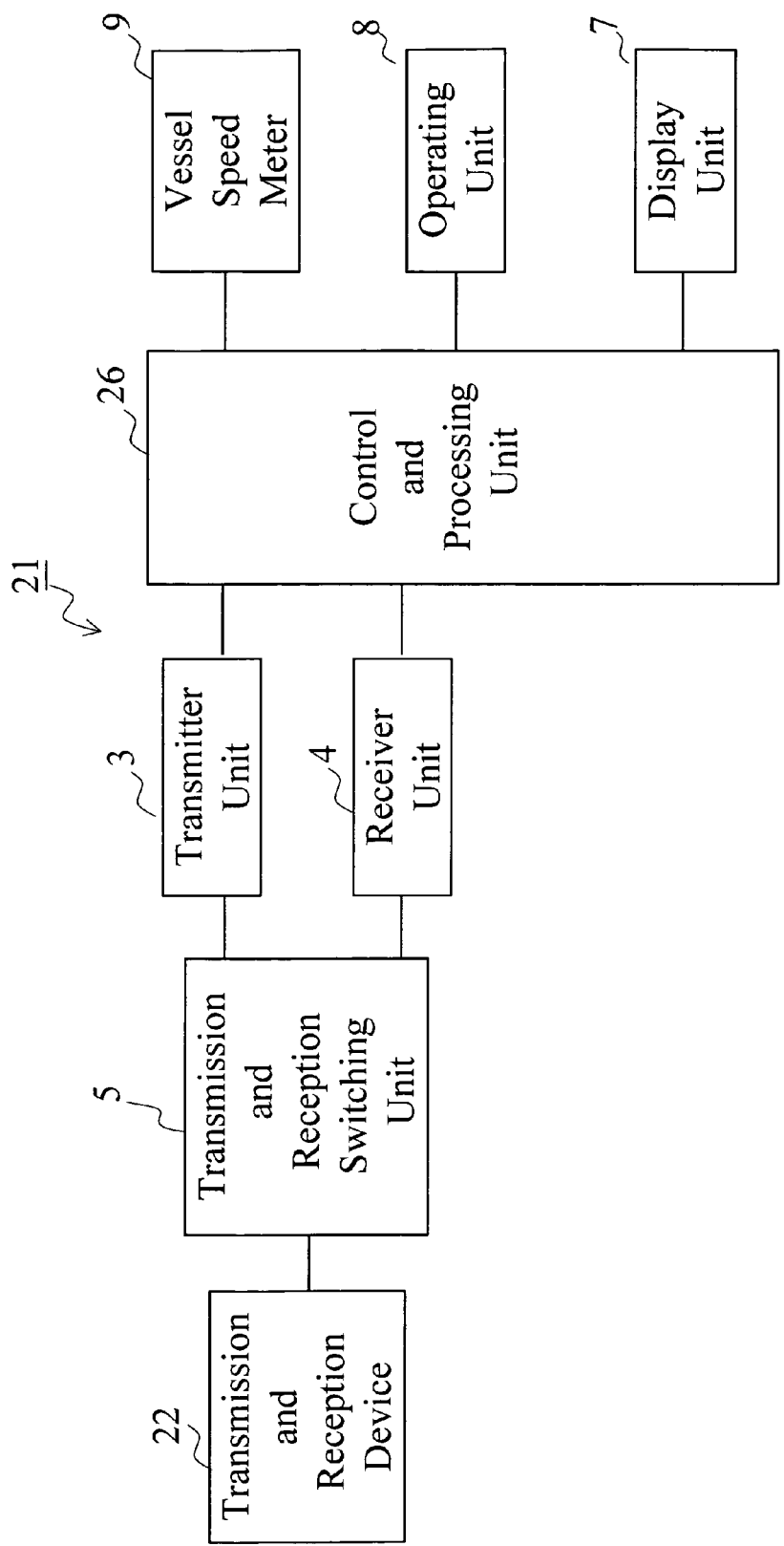
FIG. 7 shows a block diagram of a fish finder according to a third embodiment of the invention.

Next, there will be explained hereinafter a third embodiment of the present invention. FIG. 7 is a block diagram showing an arrangement of a fishfinder of the embodiment. A like numeral is assigned to a unit having like construction of a corresponding unit in the embodiments described above, explanation of which will be omitted. A fishfinder 21 transmits an ultrasound pulse having a single directional emission pattern into the water. A transmission and reception unit 22 comprises an ultrasound transducer having a single resonance frequency and transmits an ultrasound pulse having the resonance frequency as a carrier frequency and receives echo signals produced by a target as the single fish 100. The control and processing unit 26 derives an echo from received signals based on conditions of the second through the fourth and the depth of the echo is calculated. Echoes resulting from successive transmissions and appearing as the ones produced at the same depth are judged as those reflected by the same single fish and continuously monitored. The continuous monitor will distinguish a single fish from other targets with high precision. The fishfinder 21 according to the embodiment of the invention as explained above has a simple construction with an ultrasound transducer having a resonance frequency and is capable of detecting a single fish with high precision.

Figure 8:
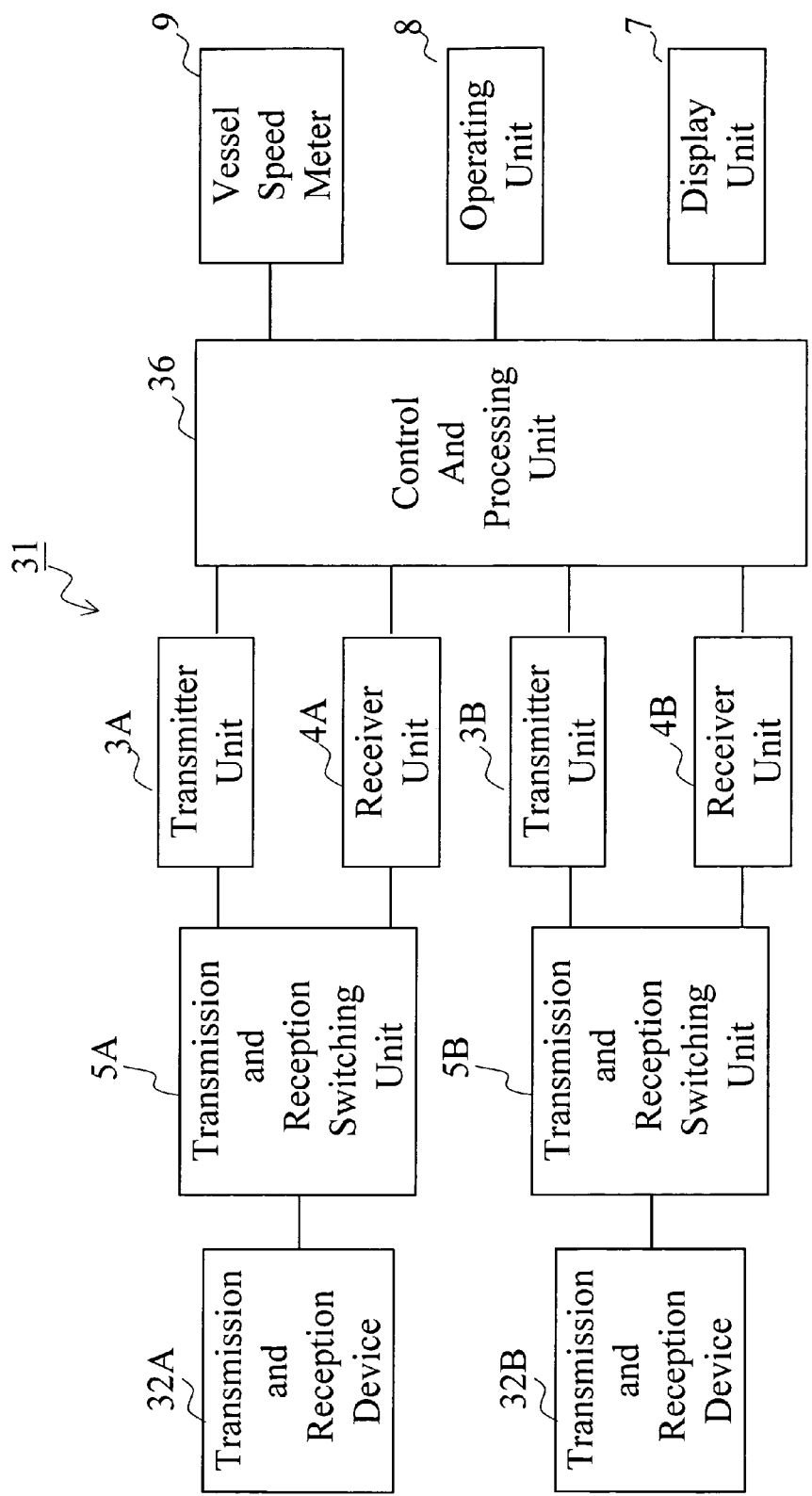
FIG. 8 shows a block diagram of a fish finder according to a fourth embodiment of the invention.

Next, there will be explained hereinafter a fourth embodiment of the invention. FIG. 8 is a block diagram showing an arrangement of a fishfinder of the fourth embodiment of the invention. Hereinafter, a like numeral is assigned to a unit having like construction of a corresponding unit in the embodiments described above, explanation of which will be omitted. With the first embodiment of the invention as shown in FIG. 1, low carrier frequency and high carrier frequency are used for an ultrasound pulse emitted in a broad beam pattern and for an ultrasound pulse emitted in a narrow beam pattern respectively. While, a fishfinder 31 shown in FIG. 8 includes two transmission and reception devices 32A and 32B having different directional emission characteristics, and transmits an ultrasound pulse having a carrier frequency and a broad directional pattern and an ultrasound pulse having the same carrier frequency as the other transducer and a narrow directional pattern alternately. The transmission and reception device 32A transmits and receives ultrasound signals in a beam form of broad directional characteristics and is coupled to a transmitter unit 3A and receiver unit 4A through a transmission and reception switching unit 5A. The transmission and reception device 32B transmits and receives ultrasound signals in a beam form of narrow directional characteristics and is coupled to a transmitter unit 3B and receiver 4B through a transmission and reception switching unit 5B. The fishfinder 31 as constructed as above transmits alternately by means of the transmission and reception devices 32A and 32B two ultrasound pulses having the same carrier frequency in a broad directional pattern and in a narrow directional pattern respectively. Since the two transmission and reception devices 32A and 32B each transmit and receive ultrasound signals having the same carrier frequency, it will be possible to detect a single fish precisely. It is also possible to use a high carrier frequency and a low carrier frequency for two ultrasound pulses respectively emitted by the transmission and reception devices, with the two pulses being emitted simultaneously.

Figure 9:
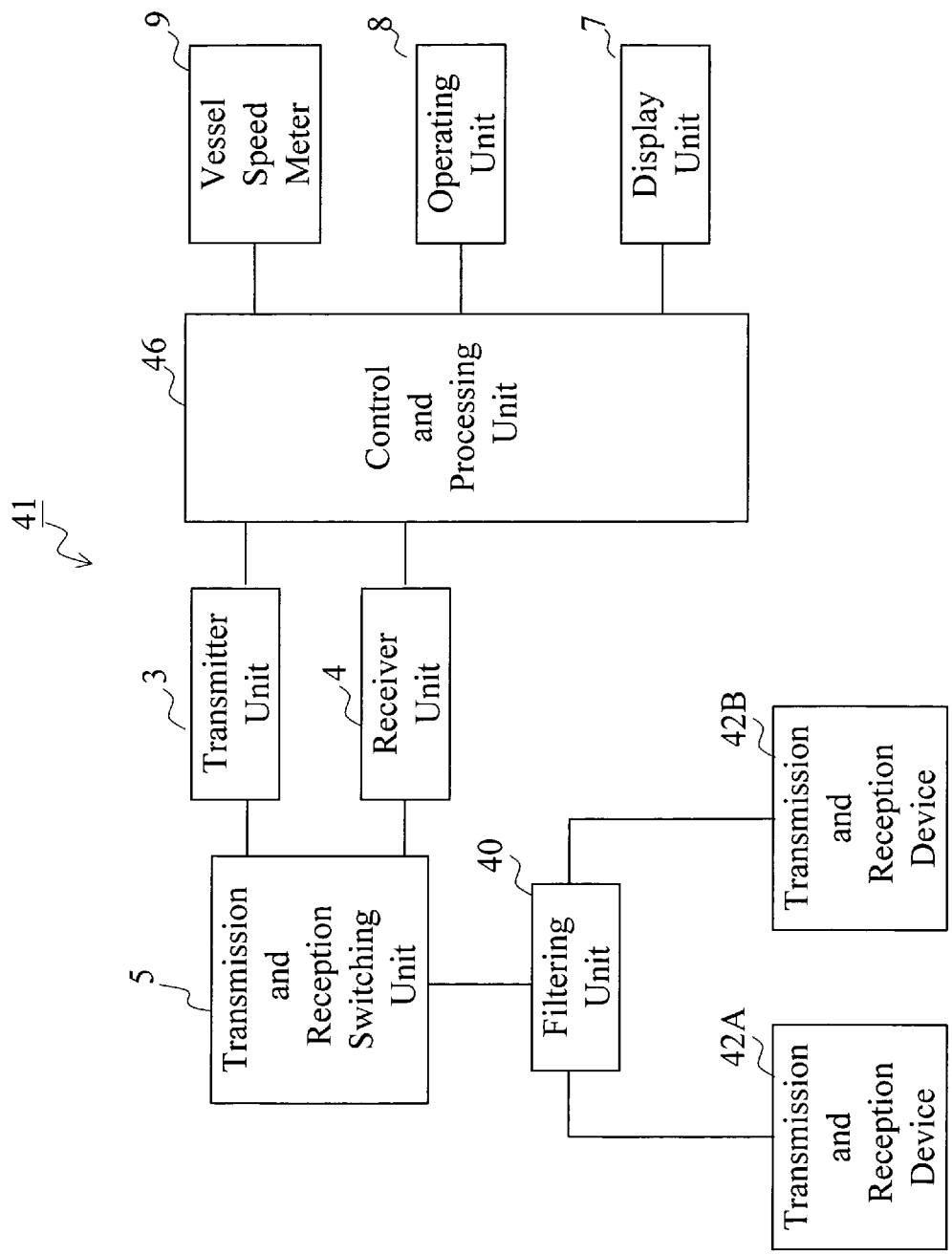
FIG. 9 shows a block diagram of a fish finder according to a fifth embodiment of the invention.

Next, there will be explained hereinafter a fifth embodiment of the invention. FIG. 9 is a block diagram showing an arrangement of a fishfinder of the embodiment. Hereinafter, a like numeral is assigned to a unit having like construction of a corresponding unit in the embodiments described above, explanation of which will be omitted. A fish finder 41 includes a transmission and reception device 42A comprising an ultrasound transducer resonating at a high frequency and a transmission and reception device 42B comprising an ultrasound transducer resonating at a low frequency and transmits alternately or simultaneously an ultrasound pulse having a high carrier frequency and an ultrasound pulse having a low carrier frequency. A transmission and reception device 42A and a transmission and reception device 42B are connected to a transmission and reception switching unit 5 through a filtering unit 40. The filtering unit 40 derives high frequency components contained in a pulse signal supplied from the transmitter unit 3 and outputs the derived frequency components to the transmission and reception device 42A, and derives low frequency components contained in the pulse signal and outputs the derived low frequency components to the transmission and reception device 42B.

Figure 10:
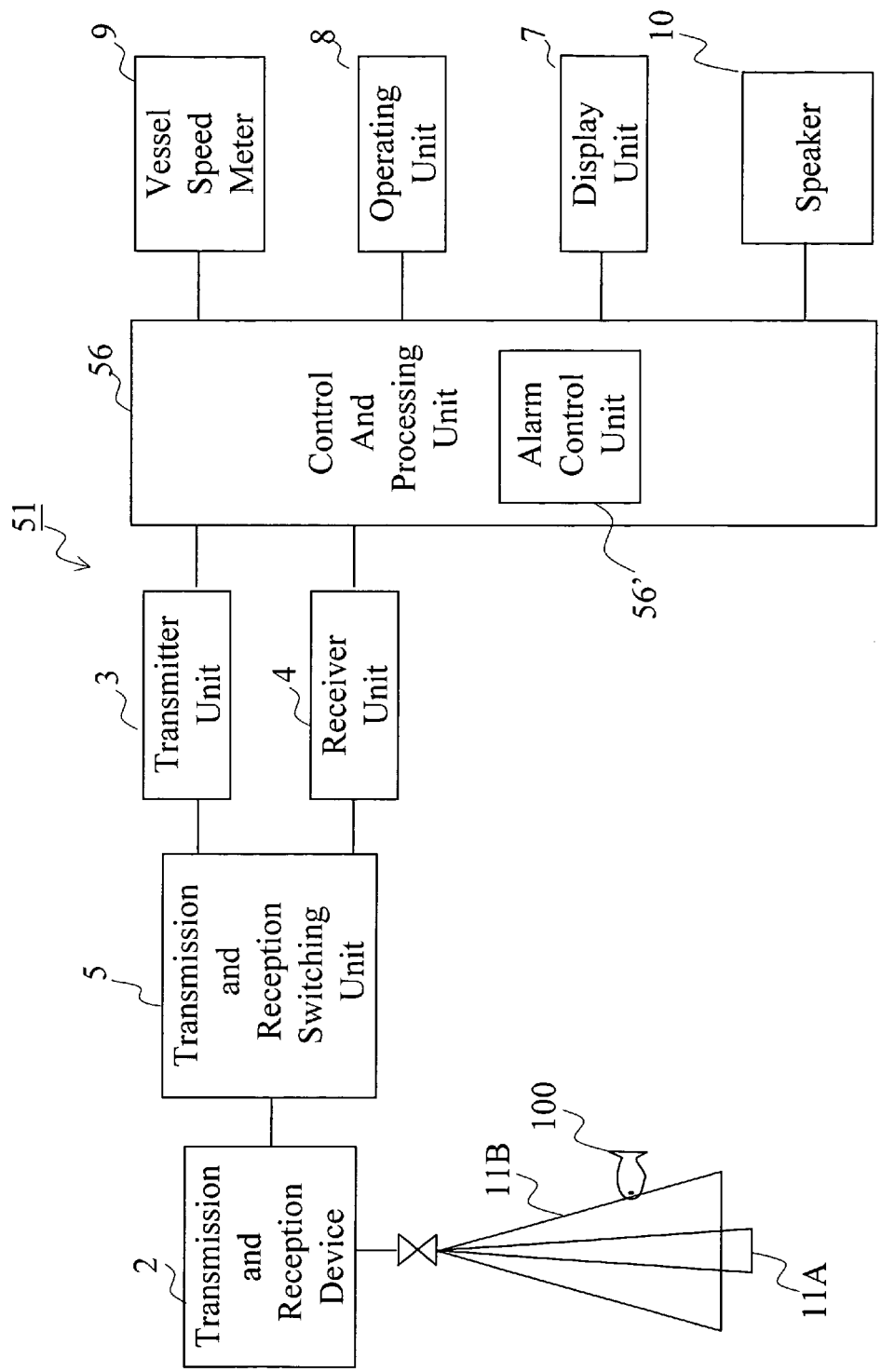
FIG. 10 shows a block diagram of a fish finder according to a sixth embodiment of the invention.

A sixth embodiment of a fishfinder according to the present invention will be explained hereinafter. FIG. 10 is a block diagram of an embodiment of the fishfinder. Hereinafter, a like numeral is assigned to a unit having like construction of a corresponding unit in the embodiments described above, explanation of which will be omitted. A fishfinder 51 is comprised with an alarm control unit 56' included in a control and processing unit 56. When single fish data obtained by a control and processing unit 36 meet conditions for outputting a single fish alarm set by an operator and supplied from a operation unit 8, the alarm control unit 56' outputs alarm sounds, alarm indications predetermined voice sounds or image data as alarms through a speaker 10 or the display unit 7. For example, a threshold of single fish length is set to 50 centimeters as a single fish alarm output condition. When a single fish more than 50 centimeters is detected, an operator is informed by producing alarm sounds and by changing brilliance of the screen. The speaker 10 may be included in the display unit 7. Respective alarms may be output at the same time, which has been set by an operator. Each alarm may be output individually. It is also possible to select no alarms produced. The alarm control unit 56' may be in the display unit 7. It may output an alarm based on single fish data produced by the control and processing unit 56. With voice sounds and image data having been set as an alarm, favorite voice sounds or image data are input by an operator through an external interface provided in the fishfinder 51 and stored in an internal memory of the control and processing unit 56 and may be output as alarms. With the display bar indicating single fish data as explained in the second embodiment of the present invention, it is also possible to set conditons in the same way for outputting single fish alarms. For example, when more than five single fishes with their fish lengths more than 50 centimeters are displayed in the portion corresponding to the latest divided part of a display bar, alarms as explained above may be produced. It is also possible to produce the number of single fishes as voice sound data having been stored in a memory. As for the language to be used for the voice, it may be the one selected by an operator at the operation unit. Voice data may be used which have been input by an operator through an external interface. A language to be used for voices may be automatically determined depending on a language setting made at the display unit of a fish finder. More detailed information can be provided to an operator by expressing in alarm sounds changes with respect to a threshold of single fish data. For example, when a threshold of a fish length is set as 30 centimeters, as dimensions of detected single fishes is larger with respect to the threshold of 30 centimeters, there may be changed sound volume, frequency or oscillation period of alarm sounds to be produced. It is also possible to output a combination of the elements as sound volume and frequency as explained above. This makes it possible to grasp changes of information about single fishes without paying attention to the screen of an indicator of fishfinder so that effective operations become possible. While one or a few ship operators work in a ship, they are sometimes preoccupied with the screen of an indicator of a fish finder and are likely to be delayed to foresee dangers in the environment. According to the invention, information changes about single fishes are advised with changes of alarm sounds so that it will not be necessary to watch closely the screen of an indicator and dangers in the environment can be sensed to avoid them. With the construction explained above, when the fishfinder 51 of the present embodiment obtains single fish data which satisfy conditions for producing single fish alarms that an operator has set, there are produced alarm sounds, alarm indications, voice sounds and image data so that an operator can instantly grasp information about single fishes in an area even if an operator takes his eyes off the screen of an indicator. This is advantageous while one or a few operators work in a ship.

Although the embodiments according to the invention have been explained by referring to FIGS. 1 through 10, embodiments of the present invention are not limited to the embodiments shown in FIGS. 1 through 10. Other embodiments or fishfinders can be constructed according to the present invention without departing from the spirit and scope of the invention.

What is claimed is:

1. A detector comprising:
   a transmission and reception device for transmitting into water ultrasound pulses and receiving echo signals;
   a single body echo detector for distinguishing a single body echo based on echo signals received; and
   a single body echo tracker for tracking a single body distinguished by the single body echo detector for consecutive plurality of transmissions; wherein
   the transmission and reception device transmits into the water at least a first ultrasound pulse and receives echo signals in a narrow beam form and transmits a second ultrasound pulse and receives echo signals in a broad beam form.

2. The detector as claimed in claim 1 wherein the single body echo detector determines an echo as a single body echo if the ratio of received signal strength of an echo received with the narrow beam pattern to an echo received with the broad beam pattern is within a predetermined range and if a signal received with the narrow beam pattern rises and falls in accordance with a predetermined condition.

3. A detector comprising:
a transmission and reception device for transmitting into water ultrasound pulses and receiving echo signals;
a single body echo detector for distinguishing a single body echo based on echo signals received; and
a single body echo tracker for tracking a single body distinguished by the single body echo detector for consecutive plurality of transmissions; wherein
the single body echo tracker tracks a single body distinguished by the single body echo detector in mutually perpendicular two directions for consecutive plurality of transmissions with the one direction representing elapsed time and the other direction representing water depth.

4. A detector comprising:
a transmission and reception device for transmitting into water ultrasound pulses and receiving echo signals;
a single body echo detector for distinguishing a single body echo based on echo signals received; and
a single body echo tracker for tracking a single body distinguished by the single body echo detector for consecutive plurality of transmissions; and
a body length detector for measuring a length of the body.

5. A detector comprising:
a transmission and reception device for transmitting into the water at least a first ultrasound pulse and receiving echo signals in a narrow beam form and for transmitting a second ultrasound pulse and receiving echo signals in a broad beam form;
a single body echo detector for distinguishing a single body echo based on echo signals received;
a single body echo tracker for tracking a single body distinguished by the single body echo detector for consecutive plurality of transmissions; and
a body length detector for measuring the length of the body based on at least an echo signal received by the transmission and reception device in a broad beam form.

6. A fishfinder comprising:
a transmission and reception device for transmitting into the water at least a first ultrasound pulse in a narrow beam form and a second ultrasound pulse in a broad beam form and receiving echo signals respectively;
a single fish echo detector for distinguishing a single fish echo based on echo signals received;
a single fish echo tracker for tracking a single fish distinguished by the single fish echo detector for consecutive plurality of transmissions; and
a fish length detector for measuring the length of the fish based on at least an echo signal received by the transmission and reception device in a broad beam form.

7. The fishfinder as claimed in claim 6 further comprising an indicator for displaying the length of a single fish or the depth of the fish at a single fish echo detected by the single fish echo detector or in the proximity of the fish echo displayed on the screen of an indicator.

8. The fishfinder as claimed in claim 6, wherein a single fish mark is displayed with a size changing in accordance with the length of the fish on the screen of the indicator.

9. The fishfinder as claimed in claim 6 further comprising an indicator for displaying a display bar moved in synchronism with transmissions of ultrasound pulses into the water, with the display bar indicated single fish information.

10. The fishfinder as claimed in claim 6 further comprising an alarm for providing an alarm if a single fish information meets a predetermined condition.

11. A detector comprising:
a transmission and reception device for transmitting into water at least a first ultrasound pulse in a narrow beam form and a second ultrasound pulse in a broad beam form and receiving echo signals respectively;
a single body echo detector for distinguishing a single body echo based on echo signals received; and
a single body echo tracker for tracking a single body distinguished by the single body echo detector for consecutive plurality of transmissions to produce a single body echo.

12. The detector as claimed in claim 11 wherein the single body echo detector determines an echo as a single body echo if the ratio of received signal strength of an echo received with the narrow beam pattern to an echo received with the broad beam pattern is within a predetermined range and if a signal received with the narrow beam pattern rises and falls in accordance with a predetermined condition.

13. The detector as claimed in claim 11 wherein the single body echo tracker tracks a single body distinguished by the single body echo detector in mutually perpendicular two directions for consecutive plurality of transmissions with the one direction representing elapsed time and the other direction representing water depth.

14. The detector as claimed in claim 11 further comprising a body length detector for measuring a length of the body.

* * * * *

UNITED STATES PATENT AND TRADEMARK OFFICE
CERTIFICATE OF CORRECTION

PATENT NO. : 7,663,974 B2
APPLICATION NO. : 11/542425
DATED : February 16, 2010
INVENTOR(S) : Inouchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 157 days.

Signed and Sealed this

Thirtieth Day of November, 2010

David J. Kappos
*Director of the United States Patent and Trademark Office*